(12) United States Patent  
Izumi

(10) Patent No.: US 8,351,228 B2
(45) Date of Patent: Jan. 8, 2013

(54) VOLTAGE CONVERSION CIRCUIT

(75) Inventor: Makoto Izumi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 406 days.

(21) Appl. No.: 12/679,568

(22) PCT Filed: Sep. 17, 2008

(86) PCT No.: PCT/JP2008/066743
§ 371 (c)(1),
(2), (4) Date: Mar. 23, 2010

(87) PCT Pub. No.: WO2009/041326
PCT Pub. Date: Apr. 2, 2009

(65) Prior Publication Data
US 2010/0207682 A1   Aug. 19, 2010

(30) Foreign Application Priority Data

Sep. 27, 2007   (JP) ................................. 2007-250314

(51) Int. Cl.
*H02M 3/18* (2006.01)
(52) U.S. Cl. ........................................... 363/60; 363/61
(58) Field of Classification Search ................ 363/59, 363/60, 61, 62, 123, 125, 127, 132, 133; 307/109, 110
See application file for complete search history.

(56) References Cited

U.S. PATENT DOCUMENTS

| 5,041,739 A | 8/1991 | Goto | |
| 5,930,122 A * | 7/1999 | Moriguchi et al. | 363/17 |
| 6,016,041 A * | 1/2000 | Weinmann | 318/245 |

(Continued)

FOREIGN PATENT DOCUMENTS

JP   57-97361 A   6/1982
(Continued)

OTHER PUBLICATIONS

Translation of the International Preliminary Report on Patentability for corresponding Application No. PCT/JP2008/066743, dated May 4, 2010, pp. 1-4.

(Continued)

*Primary Examiner* — Nguyen Tran
(74) *Attorney, Agent, or Firm* — Ditthavong Mori & Steiner, P.C.

(57) ABSTRACT

A voltage conversion circuit with reduced power consumption can be used for a power supply device (100). The power supply device (100) is composed of a power supply circuit (3) including an alternating power supply (1) and a rectifying circuit (2); a voltage conversion circuit (6) including a plurality of capacitors (4) and a switching circuit (5); and a load circuit (7). The voltage conversion circuit (6) is connected between the power supply circuit (3) and the load circuit (7). The alternating power supply (1) is connected to a switching circuit (5) of the voltage conversion circuit (6) without having the rectifying circuit (2) in between. An output voltage (potential fluctuation: a potential difference generated in the signal waveform of the power supply voltage) from the alternating power supply (1) prior to rectification is applied to the switching circuit (5). The alternating power supply (1) is also connected to the capacitors (4) through the rectifying circuit (2), and output power after rectification is applied to the capacitors. The voltage conversion circuit (6) supplies the load circuit (7) with the power supply voltage inputted from the power supply circuit (3) by increasing or reducing the voltage.

4 Claims, 6 Drawing Sheets

U.S. PATENT DOCUMENTS 6,023,416 A * 2/2000 Shikata et al. .................. 363/17
2011/0019452 A1 * 1/2011 Shinomoto et al. ........... 363/126

FOREIGN PATENT DOCUMENTS

| | | | |
|---|---|---|---|
| JP | 2-155458 | A | 6/1990 |
| JP | 3-73565 | A | 3/1991 |
| JP | 2000-40362 | A | 2/2000 |
| JP | 2004-15975 | A | 1/2004 |
| JP | 2006-166699 | A | 6/2006 |
| WO | WO 2009/041326 | A1 | 4/2009 |

OTHER PUBLICATIONS

International Search Report for PCT/JP2008/066743, dated Nov. 25, 2008, pp. 1-4.

* cited by examiner

Signal at terminal P2

Signal at terminal P5a and terminal P5b

Fig.8
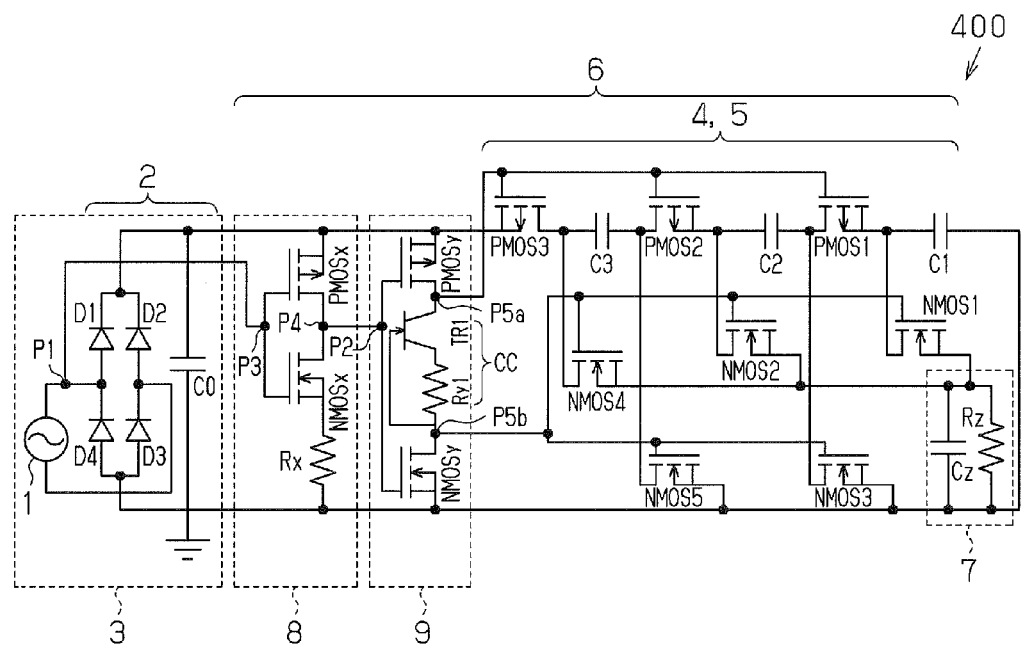
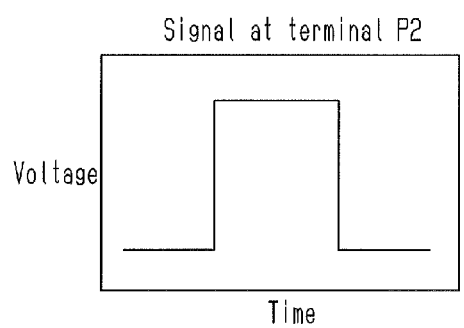
Fig.9(A)
Signal at terminal P2
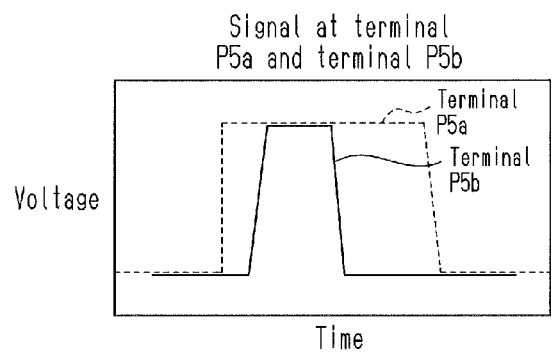
Fig.9(B)
Signal at terminal P5a and terminal P5b

VOLTAGE CONVERSION CIRCUIT

TECHNICAL FIELD

The present invention relates to a voltage conversion circuit, and more particularly, relates to a voltage conversion circuit that increases or decreases voltage input from an AC power supply.

BACKGROUND ART

A charge pump circuit (voltage conversion circuit) functioning as a circuit that increases power supply voltage from an external power supply, which normally supplies power to a load circuit, to a desired voltage value is known (for example, refer to patent document 1).

FIG. 10 is a block diagram of a charge pump circuit 101, which is described in patent document 1. The charge pump circuit 101 includes a pumping circuit 102, an oscillation circuit 103, and a detector 104. The pumping circuit 102 charge-pumps power supply voltage. The oscillation circuit 103 generates a pulse signal for controlling the drive timing of the pumping circuit 102. The detector 104 detects an output potential of the pumping circuit 102. The pumping circuit 102 uses the rising and falling of the pulse signal formed by the oscillation circuit 103 to perform charge-pumping. Internal power, which is the output of the pumping circuit 102, is increased by a fixed voltage whenever charge-pumping occurs. The internal power is supplied to, for example, a load circuit. The detector 104 compares the potential of the internal power with a reference potential and outputs a pumping enable signal to the oscillation circuit 103 whenever the internal power potential becomes lower than a predetermined potential. The oscillation circuit 103 generates a pulse signal that oscillates in constant cycles in response to the pumping enable signal. The pumping circuit 102, which is driven by the pulse signal, increases the voltage of the internal power.

[Patent Document 1] Japanese Laid-Open Patent Publication No. 2000-40362

DISCLOSURE OF THE INVENTION

Over these recent years, there has been demand for lowering the power consumed by a charge pump circuit (voltage conversion circuit). However, the charge pump circuit 101 of the prior art drives and controls the pumping circuit 102 with the pulse signal of the oscillation circuit 103. Thus, due to the power consumption of the oscillation circuit 103, there is a limit to the lowering of the power consumed by the entire charge pump circuit 101.

The present invention is directed to lowering the power consumption of the voltage conversion circuit.

One aspect of the present invention is a voltage conversion circuit connected between a power supply circuit and a load circuit. The voltage conversion circuit includes a plurality of capacitors and a switching circuit, which switches the plurality of capacitors between serial connection and parallel connection to the power supply circuit and the load circuit. Voltage input to the voltage conversion circuit from the power supply circuit is increased or decreased in accordance with the connection state of the plurality of capacitors. The power supply circuit includes an AC power supply and a rectification circuit, which rectifies voltage from the AC power supply. The switching circuit is connected to the AC power supply bypassing the rectification circuit and performs switching in accordance with a potential variation in the AC power supply.

One example of the voltage conversion circuit further includes a waveform shaping circuit which shapes a signal waveform of the potential variation into a rectangular signal waveform. The switching circuit is connected to the power supply circuit via the waveform shaping circuit.

In one example, the switching circuit includes a first circuit, which switches the plurality of capacitors to a serial connection state, and a second circuit, which switches the plurality of capacitors to a parallel connection state. The voltage conversion circuit further includes a timing adjustment circuit, which applies the potential difference to the first circuit and the second circuit at different timings. The first circuit and the second circuit are each connected to the waveform shaping circuit via the timing adjustment circuit.

In one example, the timing adjustment circuit includes a constant current circuit having a resistor and a transistor. The first circuit and the second circuit are respectively connected to one end and another end of the constant current circuit.

A further aspect of the present invention is a power supply device provided with a power supply circuit including an AC power supply and a rectification circuit, which rectifies AC voltage of the AC power supply to generate rectified voltage, and a voltage conversion circuit connected between the power supply circuit and a load circuit to increase or decrease voltage input from the power supply circuit. The voltage conversion circuit includes a plurality of capacitors and a switching circuit, which switches the plurality of capacitors between serial connection and parallel connection to the power supply circuit and the load circuit; and the switching circuit is connected to the AC power supply bypassing the rectification circuit and performs switching in accordance with a potential variation in the AC voltage of the AC power supply.

One example further includes a first wire, which connects the rectification circuit to the plurality of capacitors and supplies the rectified voltage to the plurality of capacitors, and a second wire, which connects the AC power supply and the switching circuit bypassing the rectification circuit and supplies the AC voltage of the AC power supply to the switching circuit.

BRIEF DESCRIPTION OF THE DRAWINGS

FIG. 8 is a circuit diagram of a power supply device including a voltage conversion circuit according to a fourth embodiment of the present invention;

FIGS. 9(A) and 9(B) are waveform diagrams for terminals P2, P5a, and P5b in the power supply device of the fourth embodiment.

BEST MODE FOR CARRYING OUT THE INVENTION

Figure 1:
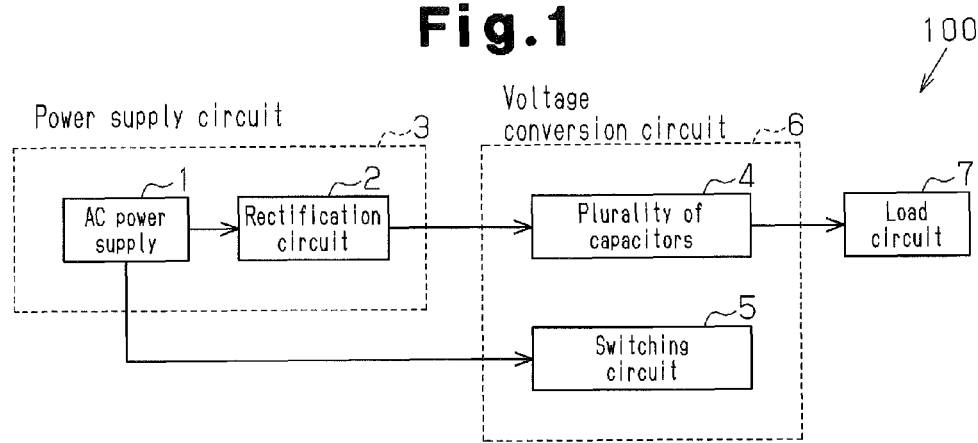
FIG. 1 is a block diagram of a power supply device including a voltage conversion circuit according to a first embodiment of the present invention.

Embodiments in accordance with the present invention will now be discussed with reference to the drawings. Throughout the drawings, same reference characters are given to same components and will not be described when unnecessary.

First Embodiment

Figure 2:
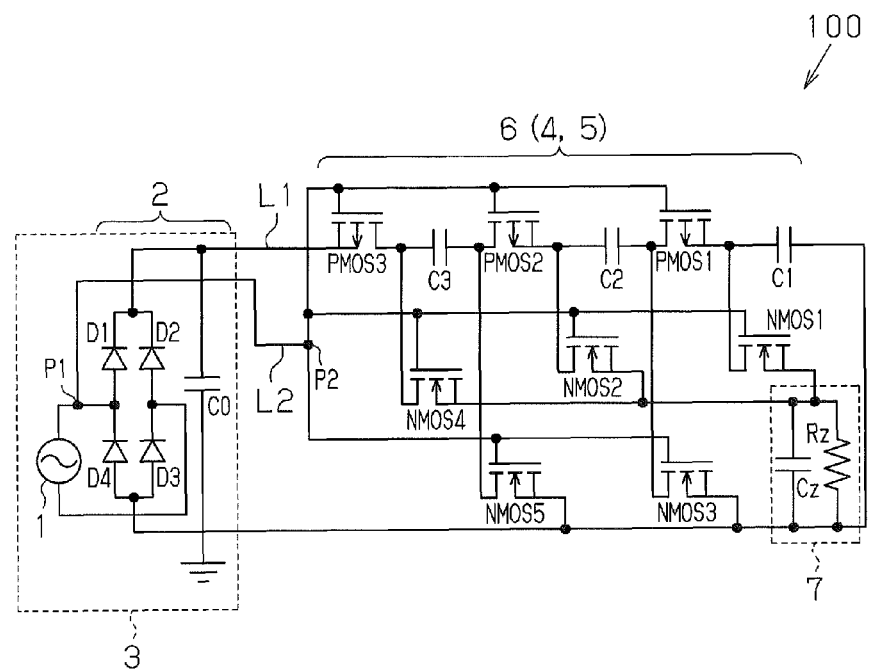
FIG. 2 is a circuit diagram of the power supply device shown in FIG. 1.
Figure 3A:
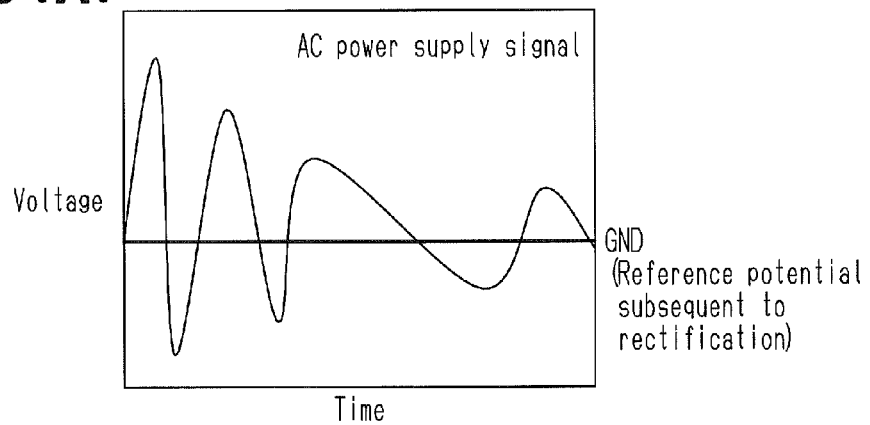
FIGS. 3(A) to 3(C) are waveform diagrams for each circuit in the power supply device of the first embodiment.
Figure 3B:
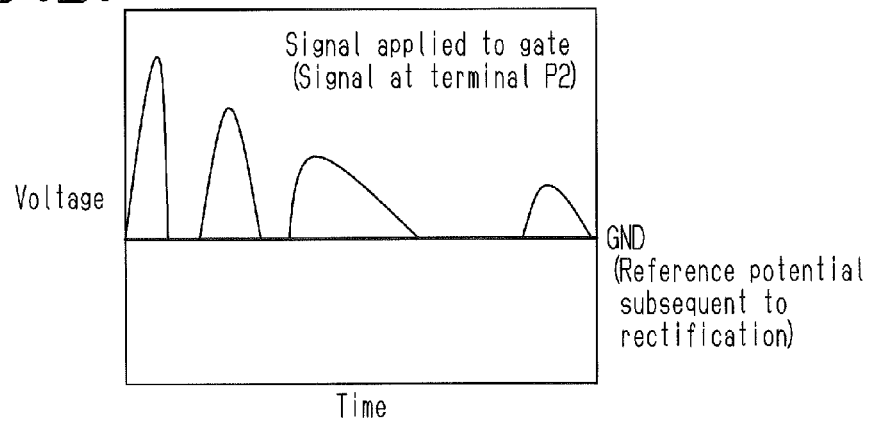
Figure 3C:
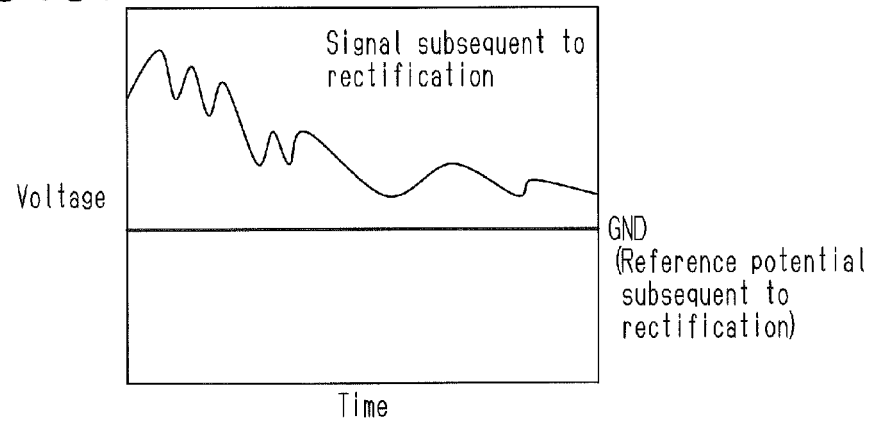

FIG. 1 is a block diagram of a power supply device including a voltage conversion circuit according to the present invention. FIG. 2 is a circuit diagram of a power supply device including a voltage conversion circuit according to a first embodiment of the present invention. FIG. 3 shows waveform diagrams (output signals) for each circuit in the power supply device of FIG. 2. FIG. 3(A) shows the signal of an AC power supply. FIG. 3(B) shows a signal applied to a gate. FIG. 3(C) shows a signal subsequent to rectification.

Referring to FIG. 1, a power supply device 100 including a voltage conversion circuit according to the present invention has a power supply circuit 3, a voltage conversion circuit 6, and a load circuit 7. The power supply circuit 3 includes an AC power supply 1 and a rectification circuit 2. The voltage conversion circuit 6 includes a plurality of capacitors 4 and a switching circuit 5, which switches the capacitors 4 between serial connection and parallel connection to the power supply circuit 3. The voltage conversion circuit 6 is connected between the power supply circuit 3 and the load circuit 7. The switching circuit 5 of the voltage conversion circuit 6 is connected to the AC power supply 1 bypassing the rectification circuit 2. Thus, output voltage prior to rectification (potential variation: potential difference produced in signal waveform of power supply voltage) is applied from the AC power supply 1 to the switching circuit 5. The capacitors 4, which are connected to the AC power supply 1 via a first wire L1 and the rectification circuit 2, are charged with rectified output voltage. This configuration synchronizes operation control of the switching circuit 5 (the switching control of the capacitors 4 between serial connection and parallel connection) with the AC voltage of the AC power supply 1. Thus, the power supply voltage input from the power supply circuit 3 is increased or decreased and supplied to the power supply circuit 3 without using an oscillation circuit (oscillation circuit for drive-controlling the switching circuit 5) that is necessary in the prior art.

A power supply device 100 including a specific voltage conversion circuit according to a first embodiment will now be discussed.

In a power supply circuit 3, an AC power supply 1 and a rectification circuit 2 are connected in parallel. The AC power supply 1 is, for example, a static induction type oscillation power generator (power generator that generates power by charging a variable capacitance electrode, using the charge to produce coulomb attractive force between opposing electrodes, producing oscillation energy by oscillating an oscillation element against the coulomb attractive force, and converting the oscillation energy to electric energy). The power supply circuit 3 is, for example, operated by external oscillation to generate an AC voltage (AC signal) as shown in FIG. 3(A). The rectification circuit 2 is formed by a bridge rectification circuit, which includes four diodes D1 to D4, and a smoothing capacitor C0. The rectification circuit 2 converts the AC voltage from the AC power supply 1 to DC voltage as shown in FIG. 3(C).

A load circuit 7 is formed by connecting a load resistor Rz and a smoothing capacitor Cz in parallel. The power supply voltage of the power supply circuit 3 is increased or decreased by a voltage conversion circuit 6 and then supplied to the load circuit 7.

The voltage conversion circuit 6 includes a plurality of capacitors 4 and a switching circuit 5, which is formed by a plurality of switches. Further, the voltage conversion circuit 6 is connected between the power supply circuit 3 and the load circuit 7. In detail, referring to FIG. 2, the voltage conversion circuit 6 is formed by combining three capacitors C1 to C3 with NMOS switches NMOS1 to NMOS5 and PMOS switches PMOS1 to PMOS3. The NMOS switches NMOS1 to NMOS5 operate to put the three capacitors C1 to C3 into a parallel connection state with respect to the power supply circuit 3 and the load circuit 7. The PMOS switches PMOS1 to PMOS3 operate to put the three capacitors C1 to C3 into a serial connection state with respect to the power supply circuit 3 and the load circuit 7. The NMOS switches NMOS1 to NMOS5 and the PMOS switches PMOS1 to PMOS3 each have a gate terminal connected to the AC power supply 1 via a second wire L2, which bypasses the rectification circuit 2. The output voltage from the AC power supply 1 prior to rectification (signal shown in FIG. 3(B)) is applied to the gate terminal of each of the NMOS switches NMOS1 to NMOS5 and the PMOS switches PMOS1 to PMOS3 via terminal P1, which is located between the AC power supply 1 and the rectification circuit 2, and terminal P2. The potential variation in the signal waveform of the signal (potential difference between the power supply voltage of the AC power supply prior to rectification and a reference potential GND subsequent to rectification) is used to control the activation and deactivation of the NMOS switches NMOS1 to NMOS5 and the PMOS switches PMOS1 to PMOS3. In this manner, the operation control of the NMOS switches NMOS1 to NMOS5 and the PMOS switches PMOS1 to PMOS3 (switching control of capacitors between serial connection and parallel connection) is executed in synchronism with the AC voltage of the AC power supply 1. The NMOS switches NMOS1 to NMOS5 are switches using N-channel MOS field effect transistors, and the PMOS switches PMOS1 to PMOS3 are switches using P-channel MOS field effect transistors.

The capacitors C1 to C3 are connected to the AC power supply 1 via the rectification circuit 2 and charged with rectified output voltage from the power supply circuit 3. In detail, during the period in which the voltage conversion circuit 6 is charged with energy from the power supply circuit 3, the NMOS switches NMOS1 to NMOS5 are deactivated and the PMOS switches PMOS1 to PMOS3 are activated to connect in series each capacitor to the power supply circuit 3 and the load circuit 7. Further, during the period in which the load circuit 7 is supplied with energy, the NMOS switches NMOS1 to NMOS5 are activated and the PMOS switches PMOS1 to PMOS3 are deactivated to connect in parallel each capacitor to the power supply circuit 3 and the load circuit 7. In this embodiment, the voltage conversion circuit 6 performs voltage conversion in the manner described above to decrease the power supply voltage and supply it to the load circuit 7. The voltage conversion circuit 6 also amplifies the current (power) supplied to the load circuit 7.

The power supply circuit 3 is one example of a "power supply circuit" according to the present invention. The load circuit 7 is one example of a "load circuit" according to the present invention. The capacitors 4 (capacitors C1 to C3) are one example of a "capacitor" according to the present invention. The switching circuit 5 (NMOS switches NMOS1 to NMOS5 and PMOS switches PMOS1 to PMOS3) is one example of a "switching circuit" according to the present invention. The PMOS switches PMOS1 to PMOS3 are one example of a "first circuit" according to the present invention. The NMOS switches NMOS1 to NMOS5 are one example of a "second circuit" according to the present invention. The AC power supply 1 is one example of an "AC power supply" according to the present invention. The rectification circuit 2 is one example of a "rectification circuit" according to the present invention. The voltage conversion circuit 6 is one example of a "voltage conversion circuit" according to the present invention.

The operation of the power supply device 100, which includes the voltage conversion circuit according to the first embodiment, will now be discussed.

First, the AC power supply 1 generates AC voltage (AC signal) from external oscillations. The AC voltage is then converted to DC voltage in the rectification circuit 2. In the voltage conversion circuit 6, when each capacitor is connected in series to the power supply circuit 3 and the load circuit 7 (when the NMOS switches NMOS1 to NMOS5 are deactivated and the PMOS switches PMOS1 to PMOS3 are activated), the capacitor is charged with rectified output power from the power supply circuit 3. When the charge of the capacitor exceeds a fixed potential, the potential variation (potential difference when the output signal rises) in a signal waveform prior to rectification from the AC power supply 1 is applied to the gate terminal of each of the NMOS switches NMOS1 to NMOS5 and the PMOS switches PMOS1 to PMOS3 to switch and connect in parallel each capacitor to the power supply circuit 3 and the load circuit 7 (the NMOS switches NMOS1 to NMOS5 are activated and the PMOS switches PMOS1 to PMOS3 are deactivated). Then, the parallel-connected capacitor supplies power to the load circuit 7. When the charge of the capacitor becomes less than a fixed potential, the potential variation (potential difference when the output signal falls) in a signal waveform prior to rectification from the AC power supply 1 is applied to the gate terminal of each of the NMOS switches NMOS1 to NMOS5 and the PMOS switches PMOS1 to PMOS3 to switch and connect in series each capacitor to the power supply circuit 3 and the load circuit 7 (the NMOS switches NMOS1 to NMOS5 are deactivated and the PMOS switches PMOS1 to PMOS3 are activated). Then, charging is performed again.

The voltage conversion circuit 6 according to the first embodiment of the present invention and the power supply device 100 have the advantages described below.

(1) The switching circuit 5 in the voltage conversion circuit 6 is connected to the AC power supply 1 bypassing the rectification circuit 2, and the operation control (activation and deactivation control) of the switching circuit 5 is executed using the potential variation of the AC power supply prior to rectification (potential difference between the power supply voltage of the AC power supply prior to rectification and the reference potential GND subsequent to rectification). This decreases (or increases) the power supply voltage input from the AC power supply 1 without using an oscillation circuit. Thus, the current consumption (power consumption) that would be necessary when using an oscillation circuit is reduced, the power consumption of the voltage conversion circuit is lowered, and the power consumption of the power supply device 100 including the voltage conversion circuit is lowered.

(2) In contrast with when using a bipolar type or junction type transistor switch, by using the NMOS switches NMOS1 to NMOS5 and PMOS switches PMOS1 to PMOS3 as the switching circuit 5, the gate portions are arranged on an insulator (insulative film) that obstructs the flow of current. This suppresses leakage current that would occur at the gate portions and lowers the current consumption of the voltage conversion circuit 6. Thus, the power consumption of the voltage conversion circuit 6 and the power supply device 100 is further reduced.

Second Embodiment

Figure 4:
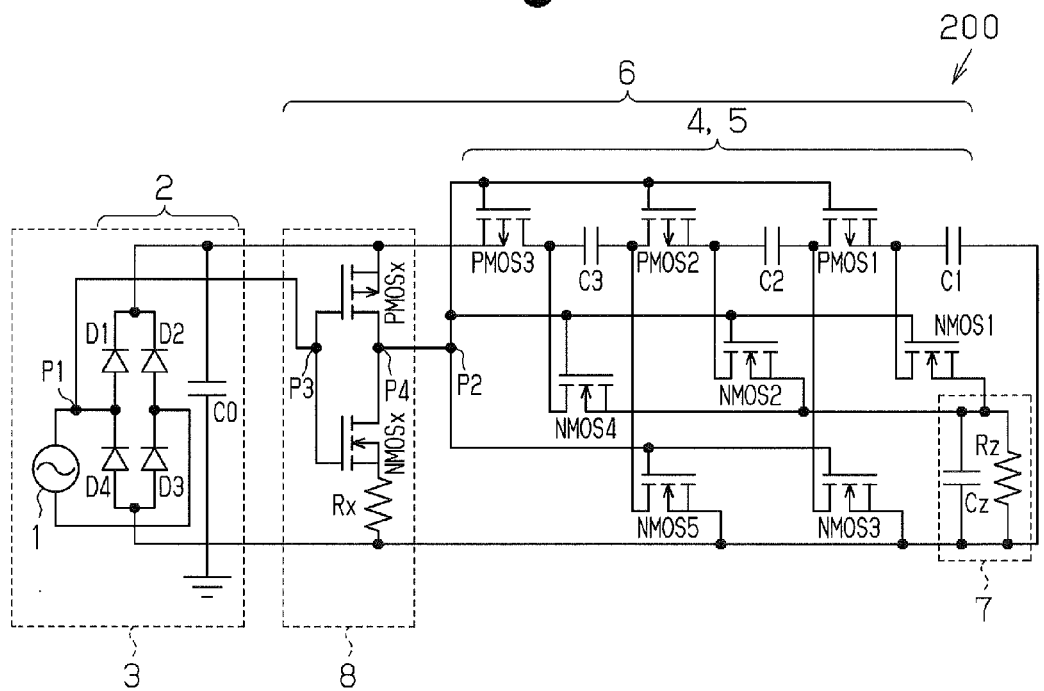
FIG. 4 is a circuit diagram of a power supply device including a voltage conversion circuit according to a second embodiment of the present invention.
Figure 5:
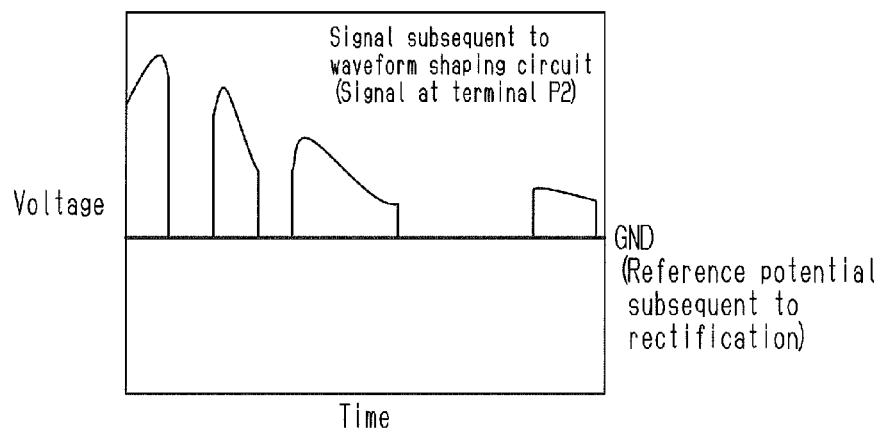
FIG. 5 is a waveform diagram for terminal P2 in the power supply device of the second embodiment.

FIG. 4 is a circuit diagram of a power supply device 200 including a voltage conversion circuit 6 according to a second embodiment of the present invention. FIG. 5 is a waveform diagram (output signal) for the power supply device 200 subsequent to waveform shaping.

The second embodiment differs from the first embodiment in that the voltage conversion circuit 6 includes a waveform shaping circuit 8, which is connected to the power supply circuit 3. Otherwise, the second embodiment is the same as the first embodiment.

The waveform shaping circuit 8 includes inverters (PMOSx and NMOSx) and a resistor Rx. Rectified output voltage is applied to the source terminal of the PMOSx, which forms an inverter. The source terminal of the NMOSx is connected to rectified reference potential GND via the resistor Rx. The waveform of the signal input to terminal P3 from the AC power supply 1 (refer to FIG. 3(B)) is converted into a rectangular signal waveform, as shown in FIG. 5, and output to terminal P4 (terminal P2). Thus, in the power supply device 200, which includes the voltage conversion circuit 6 of the second embodiment, the output voltage from the AC power supply 1 prior to rectification is shaped into a rectangular form and applied to the gate terminal of each of the NMOS switches NMOS1 to NMOS5 and the PMOS switches PMOS1 to PMOS3.

In addition to the above-described advantages (1) and (2), the voltage conversion circuit 6 according to the second embodiment of the present invention and the power supply device 200 have the advantages described below.

(3) A rectangular signal is input to the gate terminal of each of the NMOS switches NMOS1 to NMOS5 and the PMOS switches PMOS1 to PMOS3 in the voltage conversion circuit 6. Thus, activation and deactivation are ensured when switching the NMOS switches NMOS1 to NMOS5 and the PMOS switches PMOS1 to PMOS3, and the NMOS switches NMOS1 to NMOS5 and the PMOS switches PMOS1 to PMOS3 are prevented from being momentarily activated at the same time. This prevents shoot-through current in which the output current subsequent to rectifying flows directly to the load circuit 7 or ground (reference potential GND subsequent to rectifying) via the NMOS switches NMOS1 to NMOS5 and PMOS switches PMOS1 to PMOS3 that are activated at the same time. Thus, the power consumption of the voltage conversion circuit 6 and the power supply device 200 is further lowered.

Third Embodiment

Figure 6:
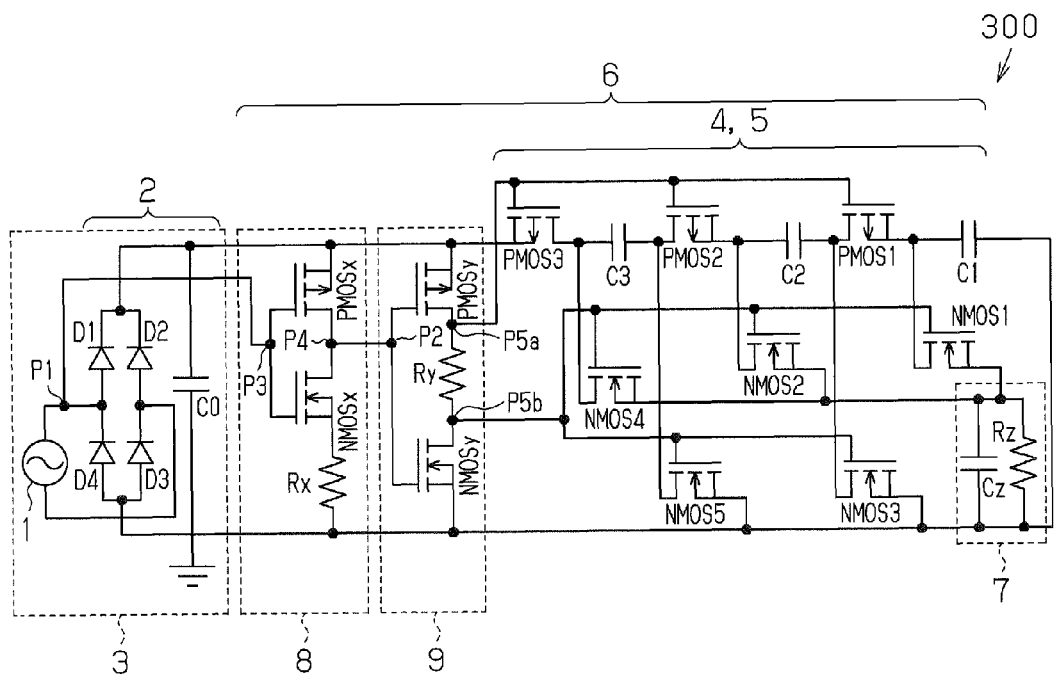
FIG. 6 is a circuit diagram of a power supply device including a voltage conversion circuit according to a third embodiment of the present invention.
Figure 7A:
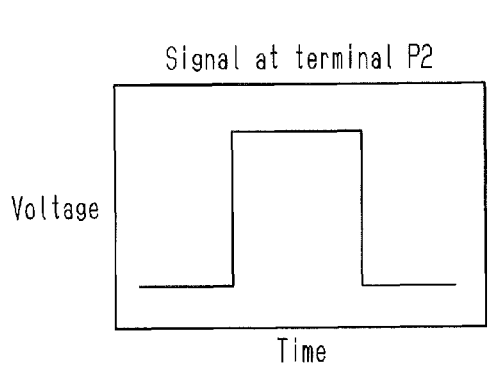
FIGS. 7(A) and 7(B) are waveform diagrams for terminals P2, P5a, and P5b in the power supply device of the third embodiment.

FIG. 6 is a circuit diagram of a power supply device 300 including a voltage conversion circuit 6 according to a third embodiment of the present invention. FIG. 7 includes waveform diagrams (output signal) in front of and behind a timing adjustment circuit of the power supply device 300.

The third embodiment differs from the second embodiment in that the voltage conversion circuit 6 includes a timing adjustment circuit 9. Otherwise, the third embodiment is the same as the second embodiment.

Figure 7B:
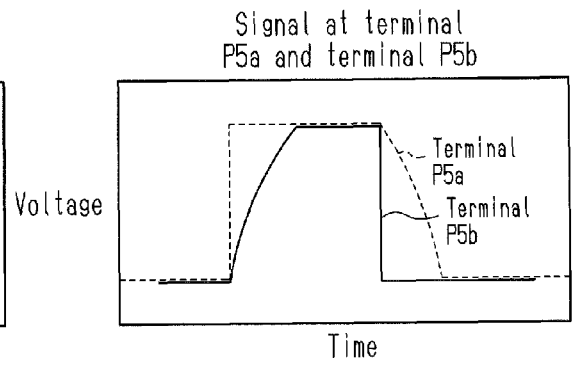
Figure 10:
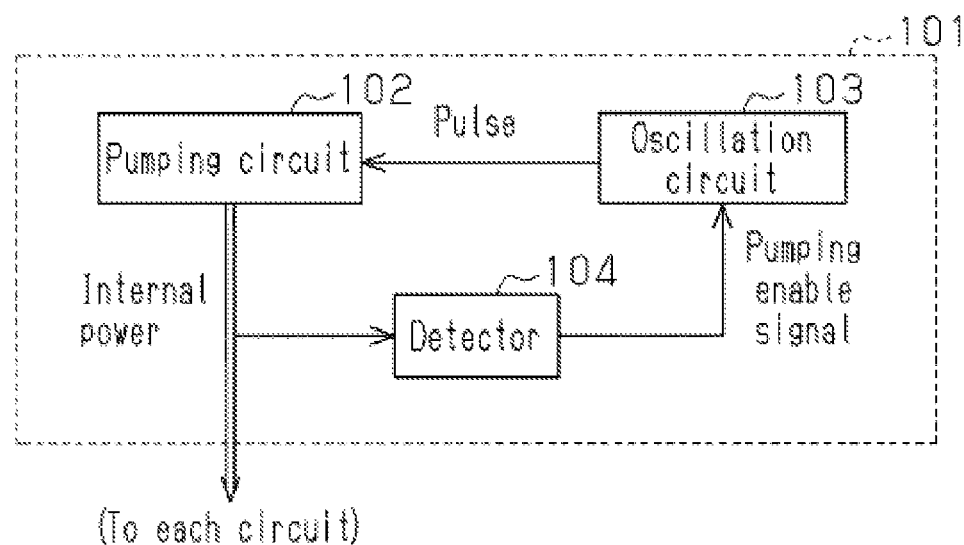
FIG. 10 is a block diagram of a prior art charge pump circuit.

The timing adjustment circuit 9 includes inverters (PMOSy and NMOSy) and a resistor Ry. Rectified output voltage is applied to the source terminal of the PMOSy in the timing adjustment circuit 9. The source terminal of the NMOSy is connected to rectified reference potential GND. Further, the drain terminal of the PMOSy and the drain terminal of the NMOSy are connected via the resistor Ry. The gate terminal of each of the PMOS switches PMOS1 to PMOS3 in the voltage conversion circuit 6 are connected via terminal P5a, which is between the drain terminal of the PMOSy and the resistor Ry. The gate terminal of each of the NMOS switches NMOS1 to NMOS5 are connected via a terminal P5b, which is between the drain terminal of the NMOSy and the resistor Ry. By passing through the timing adjustment circuit 9, the rising of the signal input to the gate terminal of each of the PMOS switches PMOS1 to PMOS3 is advanced from the rising of the signal input to the gate terminal of each of the NMOS switches NMOS1 to NMOS5, and the falling of the signal input to the gate terminal of each of the PMOS switches PMOS1 to PMOS3 is retarded from the falling of the signal input to the gate terminal of each of the NMOS switches NMOS1 to NMOS5. The reason for this is as follows. (a) When the PMOSy is activated and the NMOSy is deactivated in the timing adjustment circuit 9, due to the current that flows from the power supply via the resistor Ry, the rising of the voltage at terminal P5b is retarded from that at terminal P5a. (b) When the PMOSy is deactivated and the NMOSy is activated in the timing adjustment circuit 9, due to the current that flows to the rectified reference potential GND via the resistor Ry, the rising of the voltage at terminal P5a is retarded from that at terminal P5b. Thus, the signal input to terminal P2 from the AC power supply 1 via the waveform shaping circuit 8 (refer to FIG. 7(A)) is output as two signals respectively to terminal P5a and terminal P5b as shown in FIG. 7(B). Hence, in the power supply device 300 including the voltage conversion circuit 6 of the third embodiment, the output voltage from the AC power supply 1 prior to rectification (potential difference of signal waveform) is applied at different timings to the gate terminal of each of the NMOS switches NMOS1 to NMOS5 and the gate terminal of each of the PMOS switches PMOS1 to PMOS3 in the voltage conversion circuit 6.

The third embodiment of the present invention will now be discussed in comparison with a comparative example.

Comparative Example

The circuit configuration of a power supply device of the comparative example is similar to the third embodiment except that it does not include the voltage conversion circuit 6. More specifically, the power supply circuit 3, which includes the AC power supply 1 and the rectification circuit 2, is directly connected to the load circuit 7.

[Evaluation]

The operation of the power supply device 300 including the voltage conversion circuit of the third embodiment and one including the voltage conversion circuit of the comparative example was checked by measuring the potential difference (output voltage) between the two ends of the load resistor Rz in the load circuit and evaluating the current and power supplied to the load circuit. A static induction type oscillation power generator using an electret film (surface potential 150 V) was employed as the AC power supply 1. The main electrode configuring conditions of the AC power supply 1 were a comb-shaped electrode area being approximately 20 mm×20 mm (electrode width 0.6 mm, electrode interval 0.6 mm) and an opposed electrode interval being 20 μm. The oscillation conditions of the oscillation power generator were the frequency being 15 Hz and the amplitude being 1 mm, and the load resistor Rz of the load circuit was 500 kΩ. Table 1 shows the evaluation results for the output current and output power of each power supply device.

TABLE 1

|  | Measured Voltage (V) | Output Current (μA) | Output Power (μW) |
|---|---|---|---|
| Comparative Example (Only Rectification Circuit) | 0.90 | 1.80 | 1.62 |
| Third Embodiment | 1.54 | 3.08 | 4.74 |

As shown in table 1, the output current is approximately 1.80 μA in the power supply device of the comparative example (only the rectification circuit), whereas the output current is approximately 3.08 μA in the power supply device 300 of the third embodiment. Thus, the voltage conversion circuit 6 amplifies the output current by approximately 1.7 times. The output voltage was also amplified in the same manner. More specifically, the output power was approximately 1.62 μW in the power supply device of the comparative example that does not have the voltage conversion circuit 6, whereas the output power was approximately 4.74 μW in the power supply device 300 of the third embodiment. Thus, the voltage conversion circuit 6 amplified the output voltage by approximately 2.9 times.

Accordingly, in the third embodiment, it is apparent that the current amplification function (power amplification function) for the load circuit is effectively implemented by using the voltage conversion circuit 6 to decrease the power supply voltage. It is thus assumed that the voltage conversion circuit 6 operates without using an oscillation circuit and decreases the power supply voltage input from the AC power supply 1.

Further, in the voltage conversion circuit 6, the power supply voltage is decreased to one third by switching the three capacitors between serial connection and parallel connection. Thus, the ideal current is amplified by three times. Accordingly, the current required to operate the voltage conversion circuit 6 (current consumption) is estimated through equation (1), which is shown below. The current consumption of the voltage conversion circuit 6 includes the current consumptions of the waveform shaping circuit 8 and the timing adjustment circuit 9.

$$\text{Output Current of Third Embodiment} = 3 \times (\text{Output Current of Comparative Example} - \text{Consumption Current of Voltage Conversion Circuit}) \quad (1)$$

With the equation, the current consumption of the voltage conversion circuit 6 in the third embodiment is calculated as being approximately 0.77 μA. When assuming that the current consumption of the waveform shaping circuit 8 and the timing adjustment circuit 9 is zero, the maximum current consumption of the capacitors 4 and the switching circuit 5 would be approximately 0.77 μA. It is thus apparent that the switching circuit 5 is operable with a small current. By miniaturizing the transistor size of the NMOS switches NMOS1 to NMOS5 and the PMOS switches PMOS1 to PMOS3, the current consumption of the switching circuit 5 and ultimately the voltage conversion circuit 6 may be further reduced.

In addition to the above-described advantages (1) to (3), the voltage conversion circuit 6 and the power supply device 300 according to a third embodiment of the present invention has the advantages described below.

(4) The output voltage prior to rectification from the AC power supply 1 (potential difference of signal waveform) is applied at different timings to the gate terminal of each of the NMOS switches NMOS1 to NMOS5 and the gate terminal of each of the PMOS switches PMOS1 to PMOS3. This prevents the NMOS switches NMOS1 to NMOS5 and the PMOS switches PMOS1 to PMOS3 from being activated at the same time when switching between the NMOS switches NMOS1 to NMOS5 and the PMOS switches PMOS1 to PMOS3. This further ensures prevention of shoot-through current in which the output current subsequent to rectifying flows directly to the load circuit 7 or ground (reference potential GND) via the NMOS switches NMOS1 to NMOS5 and PMOS switches PMOS1 to PMOS3. Thus, the power consumption of the voltage conversion circuit 6 and the power supply device 300 is further lowered.

(5) The power supply voltage input from the AC power supply 1 is decreased (or increased) without using an oscillation circuit. Thus, the voltage conversion circuit 6 is operable with less current than when using an oscillation circuit (reduction of lower limit operation current). As a result, in the same manner as a static induction type oscillation power generator, the power supply device 300, which includes the voltage conversion circuit 6, is effectively operated and the current (power) supplied to the load circuit may be amplified even when using an AC power supply 1 of which current amount generated by oscillations is small.

Fourth Embodiment

FIG. 8 is a circuit diagram of a power supply device 400 including a voltage conversion circuit according to a fourth embodiment of the present invention. FIG. 9 includes waveform diagrams (output signal) in front of and behind a timing adjustment circuit of the power supply device 400.

In the fourth embodiment, a constant current circuit is used in lieu of the resistor Ry in the timing adjustment circuit 9 of the third embodiment. Otherwise, the fourth embodiment is the same as the third embodiment.

The timing adjustment circuit 9 of the power supply device 400 includes a constant current circuit CC, which is connected between the drain terminal of PMOSy and the drain terminal of NMOSy. The constant current circuit CC includes a transistor TR1 and a resistor Ry1.

In the example of FIG. 8, the source of the transistor TR1 is connected to the resistor Ry1. A node between the drain terminal of the transistor TR1 and the drain terminal of PMOSy serves as terminal P5$a$. A node between the resistor Ry1 and the drain terminal of NMOSy serves as terminal P5$b$.

In the power supply device 400 including the voltage conversion circuit 6 of the fourth embodiment, in the same manner as the third embodiment, the timing adjustment circuit 9, which includes the constant current circuit CC applies the output voltage prior to rectification from the AC power supply 1 (potential difference of signal waveform) at different timings to the gate terminal of each of the NMOS switches NMOS1 to NMOS5 and the gate terminal of each of the PMOS switches PMOS1 to PMOS3.

The employment of the constant current circuit CC improves the grading (rounding) of the signal waveforms at the terminal P5$a$ and the terminal P5$b$ (refer to FIGS. 9(A) and 9(B)). As a result, the voltage conversion circuit 6 of the fourth embodiment is operable with less current than the third embodiment and operable with further less current than when using an oscillation circuit (reduction of lower limit operation current).

The present invention is not limited to the embodiments described above and may be modified through various types of design changes or the like based on the knowledge of one skilled in the art. Such modified embodiments may also be included in the scope of the present invention.

In each embodiment, a static induction type oscillation power generator is used as the AC power supply. However, the present invention is not limited in such a manner. For example, an electromagnetic induction type oscillation power generator or piezoelectric body power generator may be used. Further, a power supply that generates normal three-phase alternating current may be used. In such cases, the corresponding advantages described above would also be obtained.

In each embodiment, the voltage conversion circuit includes three capacitors. However, the present invention is not limited in such a manner. For example, two capacitors or four or more capacitors may be switched between serial connection and parallel connection. In such a case, the advantages described above would also be obtained.

In each embodiment, a PMOS (P-channel MOS field effect transistor) and an NMOS (N-channel MOS field effect transistor) are used as the switching circuit of the voltage conversion circuit. However, the present invention is not limited in such a manner. For example, a P-channel junction field effect transistor and an N-channel junction field effect transistor may be used. A PNP bipolar transistor and an NPN bipolar transistor may also be used. Alternatively, an IGBT or a thyristor may be used. Further, these may be used in combination. In such cases, at least advantage (1), which is described above, is obtained.

The invention claimed is:

1. A voltage conversion circuit connected between a power supply circuit and a load circuit, the voltage conversion circuit comprising:

a plurality of capacitors;

a switching circuit which switches the plurality of capacitors between serial connection and parallel connection to the power supply circuit and the load circuit, with a voltage input to the voltage conversion circuit from the power supply circuit being increased or decreased in accordance with the connection state of the plurality of capacitors;

wherein the power supply circuit includes an AC power supply and a rectification circuit, which rectifies a voltage from the AC power supply;

the switching circuit is connected to the AC power supply bypassing the rectification circuit and performs switching in accordance with a potential variation in the AC power supply; and a waveform shaping circuit which shapes a signal waveform of the potential variation into a rectangular signal waveform, wherein the switching circuit is connected to the power supply circuit via the waveform shaping circuit.

2. The voltage conversion circuit according to claim 1, wherein the switching circuit includes a first circuit, which switches the plurality of capacitors to a serial connection state, and a second circuit, which switches the plurality of capacitors to a parallel connection state, the voltage conversion circuit further comprising:

a timing adjustment circuit which applies the potential difference to the first circuit and the second circuit at different timings;

wherein the first circuit and the second circuit are each connected to the waveform shaping circuit via the timing adjustment circuit.

3. The voltage conversion circuit according to claim 2, wherein the timing adjustment circuit includes a constant current circuit having a resistor and a transistor; and
the first circuit and the second circuit are respectively connected to one end and another end of the constant current circuit.

4. A power supply device comprising:
a power supply circuit including an AC power supply and a rectification circuit, which rectifies an AC voltage of the AC power supply to generate a rectified voltage;
a voltage conversion circuit connected between the power supply circuit and a load circuit to increase or decrease a voltage supplied from the power supply circuit;
wherein the voltage conversion circuit includes a plurality of capacitors and a switching circuit, which switches the plurality of capacitors between serial connection and parallel connection to the power supply circuit and the load circuit; and
the switching circuit is connected to the AC power supply bypassing the rectification circuit and performs switching in accordance with a potential variation in the AC voltage of the AC power supply; and
a waveform shaping circuit which shapes a signal waveform of the potential variation into a rectangular signal waveform,
wherein the switching circuit is connected to the power supply circuit via the waveform shaping circuit.

* * * * *